May 27, 1947. J. PRESS Re. 22,885
LEAKPROOF CONTAINER
Original Filed Dec. 14, 1939
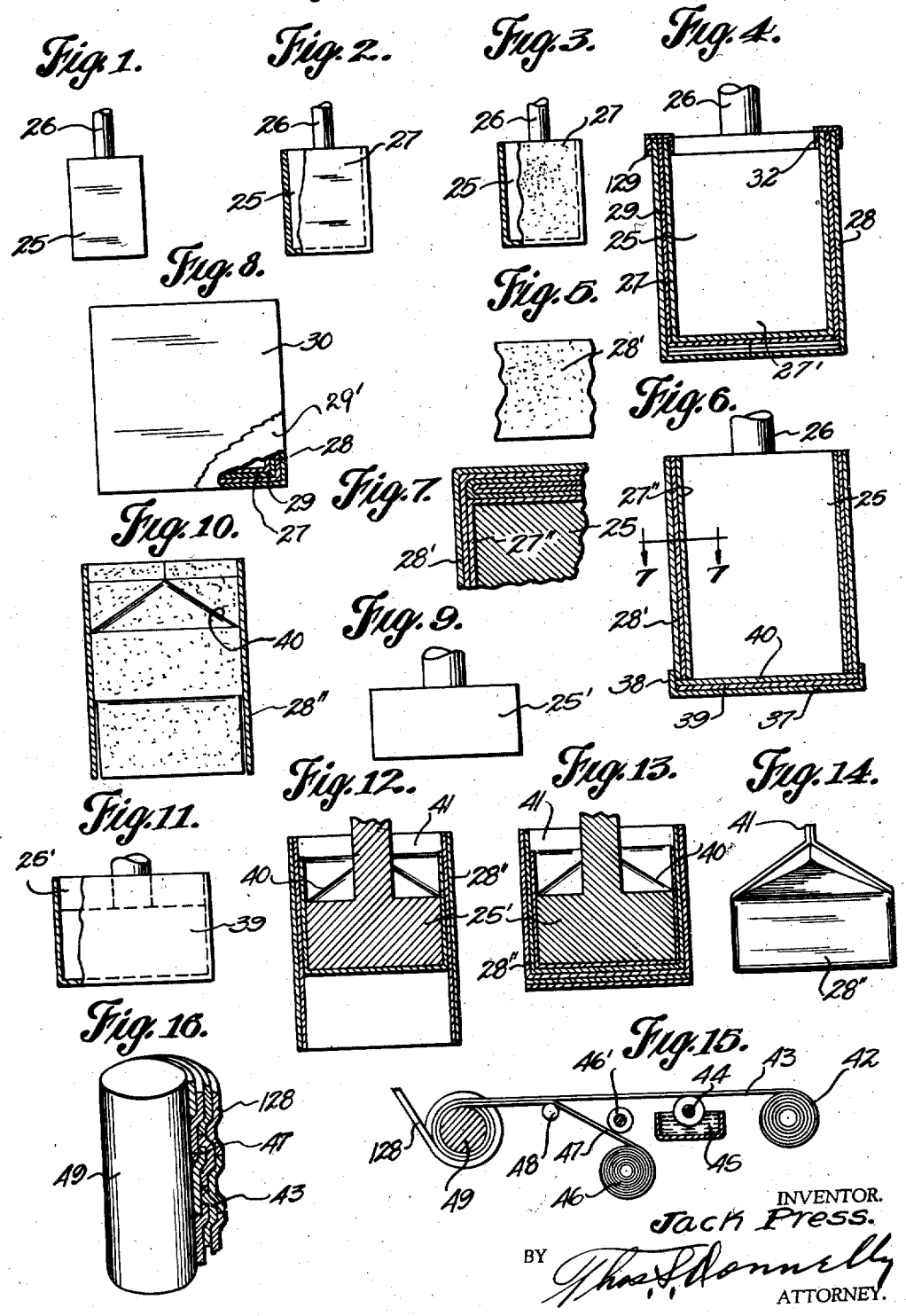
INVENTOR.
Jack Press.
BY Thos. S. Donnelly
ATTORNEY.

Reissued May 27, 1947

Re. 22,885

UNITED STATES PATENT OFFICE 22,885

LEAKPROOF CONTAINER

Jack Press, Rahway, N. J.

Original No. 2,301,580, dated November 10, 1942, Serial No. 309,225, December 14, 1939. Application for reissue September 16, 1943, Serial No. 502,697

3 Claims. (Cl. 93—94)

My invention relates to a new and useful improvement in a leak-proof container formed from cardboard, paper, or the like, and adapted for reception of liquids and solids of various kinds, and particularly oils and greases, and so arranged and constructed that the passage of liquids through the container either in its body or at its connecting joints will be prevented.

Another object of the invention is the provision of a method of forming a leak-proof container of this class.

Another object of the invention is the provision of a container of this class having a liner inserted in the container with a layer of leak-proofing material positioned between the liner and the container.

Another object of the invention is the provision of a container of this class comprising a liner positioned in the container and serving as a covering of the inner surface thereof with a layer of leak-proofing material positioned between the liner and the inner surface of the container and serving as a means of adhesion between the liner and the container.

Other objects will appear hereinafter.

It is recognized that various modifications and changes may be made in the invention and various departures from the detail of structure illustrated without departing from the spirit and scope of the invention, and it is intended that such variations, modifications, and departures shall be embraced within the scope hereof.

Submitted herewith and forming a part hereof is a drawing, in which:

Fig. 1 is a side elevational view of a form on which a container may be made.

Fig. 2 is a side elevational view of the form enveloped with a covering of lining material.

Fig. 3 is a side elevational view similar to Fig. 2 with the outer surface of the lining material covered with a suitable leak-proofing material.

Fig. 4 is a central sectional view of the container mounted on the form with the liner in position, slightly enlarged over the structure shown in Figs. 1, 2 and 3.

Fig. 5 is a sectional view of a container blank having the inner surface covered with leak-proofing material.

Fig. 6 is a central enlarged sectional view of a container in its completed form constructed from the blank illustrated in Fig. 5.

Fig. 7 is a fragmentary sectional view taken on line 7—7 of Fig. 6 slightly enlarged.

Fig. 8 is an end elevational view with a cover applied and partly broken away.

Fig. 9 is a side elevational view of a different type of form.

Fig. 10 is a central sectional view of a partly formed container or carton having the inner surface thereof covered with leak-proofing material.

Fig. 11 is the form illustrated in Fig. 9 with a covering of lining material positioned thereover.

Fig. 12 is a central sectional view showing the form illustrated in Fig. 11 inserted into the container illustrated in Fig. 10.

Fig. 13 is a central sectional view of the structure shown in Fig. 12 in another position of formation prior to the removal of the form.

Fig. 14 is a side elevational view of the container illustrated in Fig. 13 with the form removed therefrom.

Fig. 15 is a semi-diagrammatic view illustrating the method of forming a tubular container.

Fig. 16 is a fragmentary side elevational view of a tubular container in the process of formation.

In the construction of leak-proof containers of this class, it is necessary that the sealing medium be insoluble in the oil, grease, or other liquid which is to be placed in the container. It is also desirable that the sealing agent be possessed of adhesive qualities and be free from any chipping or cracking characteristics at low temperatures. It is also necessary that penetration of the material into the body of the container be eliminated or at least reduced to a minimum and these features have been kept in mind in developing the present invention. Some of these advantages are obtained as a result of the kind of leak-proofing material used, while the majority of them are present because of the method of formation and the particular type of construction resorted to.

In Fig. 1 I have illustrated a form 25 projecting upwardly from which is a shaft 26. This form 25 serves as the member around which the cardboard is pressed when forming the blank into the shape of the receptacle desired. While I have illustrated a form which is rectangular in cross section, it is believed obvious that different shapes of containers may be used while embodying the invention and different shaped forms also used. In carrying out the invention, I slip or form a covering 27 over the form 25 so as to cover this form 25. This covering 27 forms a liner for the container to be formed and this liner may be of any desired material, such as paper, tin foil, or the like, although I prefer to use a fine tissue paper. When this paper is placed over the form 25 it is in the nature of a sack and its physical contact with the face of the form is sufficient to retain this covering on the form. In carrying out the invention as illustrated in Figs. 3 and 4, I resort to a slightly different practice than I do in carrying out the invention according to Fig. 5 and Fig. 6, and Fig. 10 to Fig. 14. In carrying out the invention in accordance with the disclosure in Fig. 3 and Fig. 4, after the liner 27 is placed on the form 25, the outer face of the liner is covered with the leak-proofing material, which may be in the nature of a suitable rosin or other so-called waterproofing or leak-proofing material. The application of the leak-proofing material to the outer face of the liner 27 may be by dipping or immersion, spraying, or any other suitable method of application. After the application of the coating of leak-proofing material to the liner 27, the form 25 may be rotated at high speeds so as to remove from the outer surface of the liner which is mounted thereon any excess of leak-proofing material. This centrifuging action assures a smooth, even film, evenly distributed and of uniform thickness over the area of the liner. After the application of the leak-proofing material, the cardboard 28 or other medium with which it is intended to construct the container is folded around the structure illustrated in Fig. 3 so that the inner face of the container body 28 is pressed against the layer 29 of leak-proofing material which has been deposited on the outer surface of the liner 27. After the structure is formed as shown in Fig. 4, the form 25 is removed and the container is then adapted for reception of oil, grease, or other material which is to be disposed therein. I prefer to use a cup-shaped cover, the side walls of which would overlap the end of the container, although it is believed obvious that various types of covers may be used with satisfactory results. Where the cup-shaped cover telescoping over the end of the container is used, the end of the container is dipped or otherwise provided on its outer surface at its end with a layer of the leak-proofing adhesive material so that when the cover is placed in position after the container has been filled, the cover and the container will be in sealed relation to each other. In the event that the container is not to be filled immediately after its formation so that the layer of leak-proofing material 129 shown in Fig. 4 should become dried or non-tacky, the inner surface of the cover 30 may be covered with a layer 29' of adhesive prior to its being placed over the container. If desired, the cover may be constructed according to the method described for the construction of the container with a liner covering the inner face of the cover, and in such event the telescoping flap portion 32 of the cover would contact adhesive leak-proofing material on the inner face of the liner 27'.

In this way it becomes possible to apply a leak-proofing material to a container which will proof against leakage and which will eliminate all but a minimum absorption of the material within the container, while affording a container easily handled for filling purposes. Experience has shown that a container constructed in this manner is most efficient for the purposes intended.

In the forms shown in Figs. 5 and 6, I proceed to place the liner 27 over the form 25 as shown in Fig. 2, but instead of covering the outer face of the liner with a leak-proofing material as shown in Fig. 3, I cover the inner face of the container body 28' with the leak-proofing material and then fold this container body 28' into close contact with the liner 27'' shown in Fig. 6. This folding of the container body 28' into contact with the liner may be accomplished while the leak-proofing material is in a "wet" state or a "dry" state. In the latter case the leak-proofing material is of a tacky nature so that when subjected to pressure the container body 28' will convey the leak-proofing layer into intimate contact with the liner sufficiently for forcing the penetration of the leak-proofing material into the liner. In this way the container is formed about the form.

In this structure illustrated in Fig. 6, I provide a bottom consisting of a cap 37 which is cup-shaped and provided with a side wall 38. The bottom of this cap is provided with a layer 39 of adhesive leak-proofing material and a layer 40 of tissue paper or other suitable material. The side wall 38 embraces the container body 28' in telescopic relation and a snug fit, so that it will not be unduly removed. By pressing this bottom cap onto the container, a tight seal at the bottom is provided, and when it is desired to seal the top of the container, the same structure would be resorted to.

In Fig. 10 to Fig. 14 I have shown a slightly different type of container. Slipped over the form 25' is a suitable liner 39 and the container body 28'' is then placed over this liner-covered form. It is preferred that the inner surface of the container body be covered with the leak-proofing material, although it is obvious that the outer faces of the liner may carry the leak-proofing material, if desired. If desired, the liner may be extended beyond the ends of the container, in which event the liner would be folded inwardly to provide a seal. In the form shown in Fig. 4 the liner is shorter than the container and the inner surface of the container projecting beyond the liner is provided with a coating 129 of leak-proofing material. The container body 28'' is provided with scorings 40 for facilitating its forming into the proper shape and this container body 28'' is slipped over the structure shown in Fig. 11 and pressed into the position shown in Fig. 13, after which the form is removed and the extended portion of the container is folded into the form shown in Fig. 14, the extending flaps 41 on opposite sides being brought into engagement with each other and secured in contact so that a leak-proof closed container is thus provided. The container body 28'' is slightly larger than the liner so that it would be necessary to press it slightly out of its original form in order to contact the liner. If desired, the container may be pressed into contact with the liner only at its bottom so that the liner would be free from the inner surface of the side walls.

In Figs. 15 and 16 I have illustrated the invention applied to a tubular container. From a roll 42 of calendered paper is fed a strip 43 which passes over and is in contact with a roller 44, rolling in a resinous solution 45 so that the inner face of the layer 43 will be covered with the adhesive leak-proofing material. From a roll 46 is fed a strip 47 of liner material, such as tissue paper, which is brought into engagement with the inner face of the strip 43 by means of the roller 48, and these two strips then are rolled on a mandril 49, the strips 43 engaging each other at their edges and the strips 47 being wound on the mandril or arbor in overlapping relation, as shown in Fig. 16. The strip 47 contacts the adhesive-carrying roller 46′ so that the strips 43 and 47 are secured together with two layers of adhesive leak-proof material between them. The strips 43 are covered by the strip 128 which is spirally wound with its edges engaging each other.

The leak-proofing material may be either liquid, a molten normally congealed product, or a product normally plastic or of a paste-like consistency.

It is believed obvious that the container may be used for other materials than liquids, oils, and greases, because the container is moisture-proof and would be adapted for reception of other materials which it was desired to shield from moisture.

It will be noted that the invention lends itself to high-speed production inasmuch as the leak-proofing is accomplished during the operation of producing the container. It will also be noted that in addition to the advantages enumerated, the invention eliminates direct contact between the sealing medium and the form, thus preventing sticking of the liner to the form. There is formed a continuous uninterrupted seal minimizing and in most cases entirely eliminating direct contact between the contents and the sealing medium and the possibility of liquids working through the sealing medium.

In this way I have provided a container and a method of constructing the same whereby a leak-proof container may be easily and quickly manufactured and a container provided in which oils and greases, and similar materials, may be deposited without leakage therefrom and without absorption thereby.

What I claim as new is:

1. In the method of forming a leak-proof container, the steps consisting in shaping a liner to the shape of the container, coating the outer surface of the liner with a leak-proofing material and rotating the coated liner at high speeds for removing excessive leak-proofing material and uniformly distributing the same over the liner.

2. In the method of forming a leak-proof container, the steps consisting in shaping a liner to the shape of the container, coating the outer surface of the liner with a leak-proofing material and rotating the coated liner at high speeds for removing excess leak-proofing material and uniformly distributing the same over the liner, and inserting the liner into the container and bringing the inner surface of the container into contact with the leak-proofing coating on the outer surface of the liner.

3. In the method of forming a leak-proof container, the steps consisting in shaping a liner to the shape of the container, coating the outer surface of the liner with leak-proofing material and rotating the coated liner at high speeds for removing excess leak-proofing material and uniformly distributing the same over the liner, and applying sheet material of the cardboard type to the formed liner to provide a container body enclosing the formed liner and the leak-proofing film thereon within said container body.

JACK PRESS.

REFERENCES CITED

The following references are of record in the file of this patent:

UNITED STATES PATENTS

| Number | Name | Date |
|---|---|---|
| 218,193 | Preater | Aug. 5, 1879 |
| 1,203,832 | Wood | Nov. 7, 1916 |
| 156,694 | Chinnock | Nov. 10, 1874 |
| 966,186 | Fallon | Aug. 2, 1910 |
| 1,442,775 | Wood | Jan. 16, 1923 |
| 1,498,909 | Grimm | June 24, 1924 |